(12) United States Patent
Volkmann

(10) Patent No.: US 8,786,127 B2
(45) Date of Patent: Jul. 22, 2014

(54) CONNECTING APPARATUS FOR CONNECTION OF FIELD DEVICES

(75) Inventor: Hans Volkmann, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 611 days.

(21) Appl. No.: 13/087,034

(22) Filed: Apr. 14, 2011

(65) Prior Publication Data

US 2011/0254365 A1  Oct. 20, 2011

(30) Foreign Application Priority Data

Apr. 19, 2010 (EP) .................................. 10004128

(51) Int. Cl.
*H02J 1/00* (2006.01)
*G05B 19/042* (2006.01)

(52) U.S. Cl.
CPC .................................. *G05B 19/0425* (2013.01)
USPC ........ 307/1; 307/82; 307/77; 307/64; 307/52; 702/182; 702/57; 702/189

(58) Field of Classification Search
USPC ......... 307/1, 125, 56, 77, 80–82, 23, 112, 38; 702/30, 50, 65, 182, 60, 61
See application file for complete search history.

(56) References Cited

U.S. PATENT DOCUMENTS

| | | | |
|---|---|---|---|
| 7,493,524 B2 | 2/2009 | Fehrmann et al. | |
| 8,473,250 B2* | 6/2013 | Adest et al. .................. | 702/182 |
| 2001/0022714 A1 | 9/2001 | Graube | |
| 2007/0052298 A1* | 3/2007 | Merkel et al. ................. | 307/112 |
| 2010/0013325 A1 | 1/2010 | Vande Vusse et al. | |
| 2010/0045107 A1* | 2/2010 | Cohen et al. .................... | 307/23 |
| 2010/0231055 A1* | 9/2010 | Black et al. .................... | 307/125 |
| 2011/0208440 A1* | 8/2011 | Pechstein et al. ............... | 702/30 |

FOREIGN PATENT DOCUMENTS

WO    WO 2005/053221 A2    6/2005

* cited by examiner

*Primary Examiner* — Rexford Barnie
*Assistant Examiner* — Jagdeep Dhillon
(74) *Attorney, Agent, or Firm* — Cozen O'Connor

(57) ABSTRACT

A connecting apparatus for connection of field devices comprising a bus connection for connection to a bus, a field device connection for connection for a field device, a power supply path and a signal path, wherein the power supply path and the signal path are arranged in parallel with one another between the bus connection and the field device connection such that a supply voltage carried on the bus is isolated from a signal, which is likewise carried on the bus, by a first coupling unit arranged in the power supply path and a second coupling unit arranged in the signal path.

8 Claims, 1 Drawing Sheet

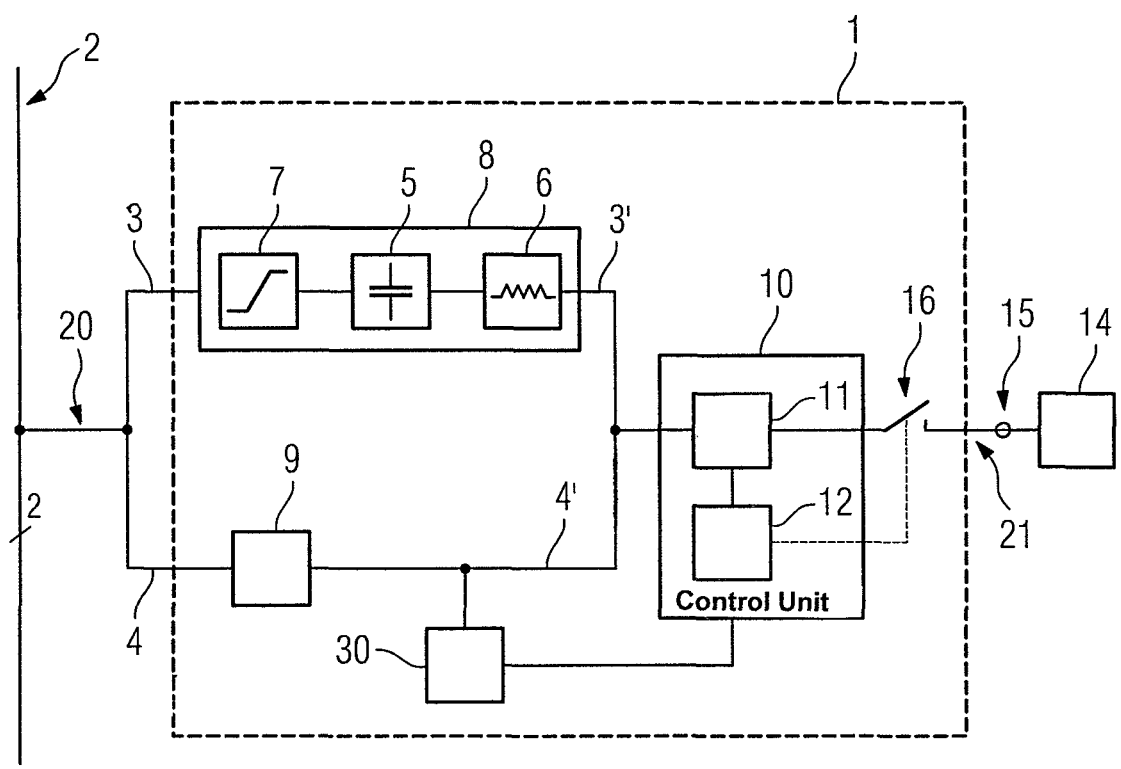

CONNECTING APPARATUS FOR CONNECTION OF FIELD DEVICES

BACKGROUND OF THE INVENTION

1. Field of the Invention

The invention relates to connection devices and, more particularly, to a connecting apparatus for interconnecting field devices, comprising a bus connection for connection to a bus and a field device connection for connection of a field device.

2. Description of the Related Art

WO 2005/053221 A2 discloses connecting apparatuses. Reference is expressly made to WO 2005/053221 A2 with regard to the capability to implement the present invention with respect to the connecting apparatus for field devices during operation of a network, such as a Profibus PA network. Accordingly, the content of WO 2005/053221 A2 is incorporated herein by reference in its entirety.

In the case of connecting apparatuses for field devices that communicate over a bus, i.e., a fieldbus, with a superordinate automation appliance, the bus cable forms a common component for all the field devices. Consequently, the failure of the bus cable affects all the field devices. Furthermore, faults in the field devices, such as a short on the transmission line or emission of disturbance signals on the transmission line, can adversely affect the communication of the other field devices connected to the fieldbus.

An extension of a fieldbus with field devices, such as a Profibus PA/Foundation Fieldbus (PA/FF), should be possible during operation without disturbing the fieldbus or its subscribers that are connected to the fieldbus. When field devices are being connected to the connecting apparatus, the communication of all the appliances or other field devices can be disturbed by a current change on the fieldbus.

SUMMARY OF THE INVENTION

It is therefore an object of the present invention to provide a connecting apparatus for field devices, which allows a disturbance-free bus extension.

This and other objects and advantages are achieved by a connecting apparatus for connection of field devices, comprising a bus connection for connection to a bus, a field device connection for connection of a field device, a power supply path and a signal path, where the power supply path and the signal path are arranged in parallel with one another between the bus connection and the field device connection such that a supply voltage carried on the bus is isolated from a signal, which is likewise carried on the bus, by a first coupling unit arranged in the power supply path, and a second coupling unit arranged in the signal path. Isolation or splitting of the power supply path and the signal path prevents a voltage dip from occurring on the bus, while a further field device is being connected to the connecting apparatus. The voltage dip caused by the connection process could, for example, result in other connected field devices being reset, leading to a failure of the respective field devices and/or to collapse of the entire communication process. In accordance with the invention, the power supply path is isolated from the signal path. As a result, disturbances, such as those caused by the connection of field devices, can no longer have any damaging noticeable effect. Here, reactions to disturbances comprises, for example, bouncing of connecting contacts with the contact conductors to be connected. This bouncing would cause voltage drops during telegram transmission, and would interfere with the telegrams.

The connecting apparatus has a measurement device, which is arranged between the coupling units and the field device connection to eliminate a disturbance signal over the signal path, where the measurement device is configured to detect a current change and to operate a switching element such that a current flow through the field device connection is interrupted. The described current change can occur, for example, as follows: during a starting-up phase of an automation system having a fieldbus, connecting apparatuses and field devices, or during a further extension of the fieldbus, it is possible for a fitter to wish to connect a field device to an existing connecting apparatus by contacts that are provided to the connecting apparatus. The connection process is a manual activity and not a clean, exact or precise switching process. As a result, it is possible for the line with its conductors to briefly make contact, and to break contact again because of the mechanical introduction, thus causing disturbances when the line is connected to the field device and the field device is, in turn, intended to be connected to contacts of the connecting apparatus. However, the connecting apparatus in accordance with the invention has the distinct advantage in that an initial contact with the conductors of the line is identified at the contacts because a first current flows, although for a short time. The measurement device identifies this current value, where the measurement device subsequently signals this identified current change to a switching element that immediately interrupts the current flow through the field device connection. As a result, the disturbances can no longer cause any noticeable reaction on the bus.

In an embodiment of the connecting apparatus, a delay circuit is provided, which controls the switching element after the measurement device identifies a current change such that the switching element remains open for a predetermined time period. Initially, the predetermined time period can be selected as required. This selectable time period is preferably governed by a time period for a connection process, which is required by someone performing the start-up process that wishes to connect the field device. For example, the time period could be set to 5 seconds because, after an initial contact, which leads to a current change or to a current surge, it can be said with sufficient probability after 5 seconds has elapsed that the conductors of the line to the field device have now been securely mounted on the contacts of the connecting apparatus and, as a consequence, it is no longer possible for any disturbing current changes to occur.

In another embodiment, the connection apparatus has a current rise limiting circuit in the power supply path to furthermore minimize the disturbances and reactions on the bus caused by a connection process. Here, the current rise limiting circuit also represents a form of decoupling, because the current rise limiting circuit allows only a slow current change, such that the disturbing current changes, which themselves are rapid, cannot be made noticeable on the bus.

In a further embodiment, an energy store is arranged in the power supply path. In an embodiment, the energy store comprises an energy storage capacitor. A sudden demand for the required energy caused by the connection of a field device can thus be obtained from the energy store.

In a further embodiment for further optimizing the connecting apparatus, a monitoring device is provide for the connecting apparatus, which is configured to monitor telegram traffic on the bus, where the monitoring device is connected to a control unit that is configured to allow the field device to be connected only in a telegram pause. This ensures that any disturbances that are created occurs only during the time interval of a telegram pause, i.e., when no telegram is being transmitted to the bus.

In another embodiment, the first coupling unit is advantageously provided with a low-pass filter, such as a coil or an electronic circuit, for example, an impedance converter.

In the explosive-hazard field, there is often a requirement for galvanic or electrical isolation. This can be achieved by Using a DC/DC converter in the first coupling unit, and preferably an optical interface in the second coupling unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment will be explained in more detail with reference to the drawing, in which:

The FIGURE is a schematic block diagram of a connecting apparatus for connection of field devices in accordance with an embodiment of the invention.

DETAILED DESCRIPTION OF THE PREFERRED EMBODIMENTS

The FIGURE illustrates a connecting apparatus 1 for field devices 14. The connecting apparatus 1 has a bus connection 20 that is connected to a bus 2. The bus 2 comprises a two-wire Profibus PA. The connecting apparatus 1 also has a field device connection 21 to connect field devices 14. The connecting apparatus 1 furthermore has contacts 15 to allow the field devices 14 to be connected to the connecting apparatus 1 via appropriate lines with their conductors.

A power supply path 3, 3' for transmitting a supply voltage which is provided in addition to a data signal through the bus 2, and a signal path 4, 4' for the data signal, are arranged between the bus connection 20 and the field device connection 21. Here, the power supply path 3, 3' and the signal path 4, 4' are arranged in parallel with one another between the bus connection 20 and the field device connection 21. This arrangement allows the supply voltage and the data signal that are both present on the bus 2 to be isolated from one another. This isolation is achieved by a first coupling unit 8 arranged in the power supply path 3, 3', and by a second coupling unit 9 arranged in the signal path 4, 4'.

When view from left-to-right, i.e., starting from the bus 2, a signal that has been carried on the bus can pass over the bus connection 20 and the signal path 4 to the second coupling unit 9, by which the signal is decoupled from the supply voltage that is carried on the bus 2. Analogously, the supply voltage is isolated from the signal by the first coupling unit 8 in the power supply path 3, 3'. When viewed from the direction of the field device connection 21, the supply voltage and the signal are rejoined together downstream from the first coupling unit 8 and downstream from the second coupling unit 9.

A control unit 10 is connected to this combination point. The control unit 10 has a measurement device 11 and a delay circuit 12. The control unit 10 and a switching element 16 are connected in series and, when the switching element 16 is closed, allow a supply current flow and a signal current flow to the field device 14 that is connected by the contacts 15.

The process of connecting the field device 14 to the connecting apparatus 1 through the contacts 15 will be described in the following text. In contrast to the fixed electrical connection shown in the FIGURE, a detached connection must initially be contemplated for the connection process. When a connecting line of the field device 14 is connected for the first time to the contacts 15, the conductors initially touch the contacts 15 for the first time, thus causing a current to flow. This current flow describes a path from the bus 2, through the bus connection 20, through the power supply path 3, through the first coupling unit 8, into the control unit 10, through the switching element 16, through the contacts 15 and, finally, to the field device 14. Here, a measurement device 11 is arranged in the control unit 10, and is configured to detect this current flow or the current change and to operate the switching element 16 such that a current flow through the field device connection 21 is first interrupted.

The delay circuit 12, which is arranged within the control unit 10, is configured such that, after the measurement device 11 has identified a current change, the switching element 16 is controlled such that it remains open for a fixed time period, such as 5 seconds.

A fitter connecting the field device to the connecting apparatus 1 now therefore has a time period of 5 seconds to correctly connect the conductors without further disturbances being caused. Once the predetermined time period has elapsed, the switching element 16 is reclosed, and a current value is determined by the measurement device 11. If the current, which is now flowing, is now constant, the field device connection 21 is permanently connected by the switching element 16. If fluctuations can still be identified in the determined current measured value, the disconnection process and the subsequent connection process are repeated.

In a further embodiment, the connecting apparatus 1 includes a monitoring device 30 that is connected by a first connection to the bus 2, and is connected by a second connection to the control unit 10. The monitoring device 30 is configured to monitor telegram traffic and to transmit an enable signal to the control unit 10 during times when there are no telegrams or in telegram pauses, such that the control unit 10 causes the switching element 16 to be connected, i.e., closed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A connecting apparatus for connection of field devices, comprising
a bus connection for connection to a bus;
a field device connection for connection of a field device;
a power supply path;
a first coupling unit arranged in the power supply path;

a signal path; and a second coupling unit arranged in the signal path;

a measurement device arranged between the first and second coupling units and the field device connection;

a switching element arranged between the measurement device and the field device connection, the measurement device being configured to detect a current change and to operate the switching element such that a current flow through the field device connection is interrupted in response to the detected current change;

a monitoring device configured to monitor telegram traffic on the bus; and a control unit connected to the monitoring device and configured to allow the field device to be connected only during a telegram pause;

wherein the power supply path and the signal path are arranged in parallel with one another between the bus connection and the field device connection such that a supply voltage which is carried on the bus is isolated from a signal which is also carried on the bus by the first coupling unit arranged in the power supply path and by the second coupling unit arranged in the signal path.

2. The connecting apparatus as claimed in claim 1, further comprising:

a delay circuit configured to control the switching element after an identified current change such that the switching element remains open for a predetermined time period.

3. The connecting apparatus as claimed in claim 1, further comprising:

a current rise limiting circuit arranged in the power supply path.

4. The connecting apparatus as claimed in claim 1, further comprising:

an energy store arranged in the power supply path.

5. The connecting apparatus as claimed in claim 1, wherein the first coupling unit includes a low-pass filter or an electronic circuit.

6. The connecting apparatus as claimed in claim 5, wherein the electronic circuit is an impedance converter.

7. The connecting apparatus as claimed in claim 1, wherein the second coupling unit has a galvanic isolation device.

8. The connecting apparatus as claimed in claim 7, wherein the galvanic isolation device is an optical interface.

* * * * *